C. S. LYLE.
RIVETING TOOL.
APPLICATION FILED MAY 9, 1917.
1,248,355.  Patented Nov. 27, 1917.
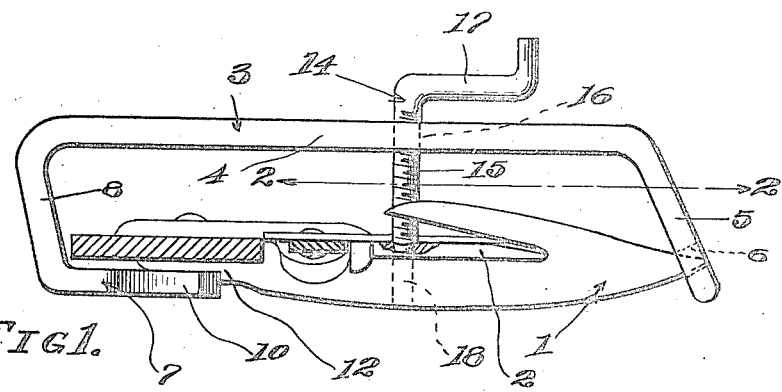
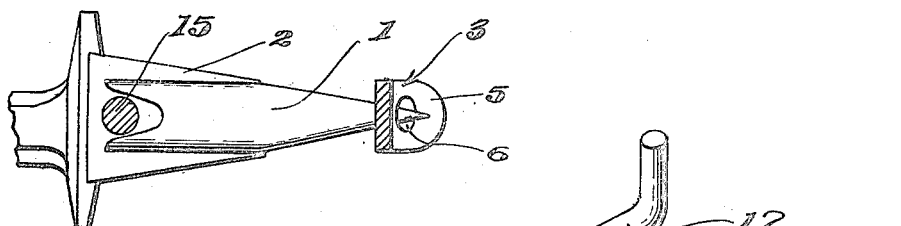
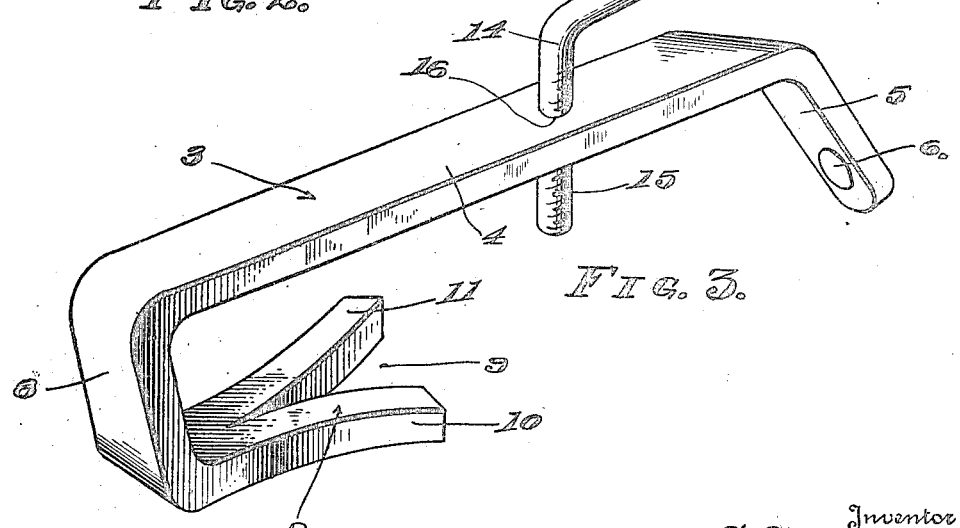
Inventor
C. S. LYLE.

UNITED STATES PATENT OFFICE.

CHARLES S. LYLE, OF SHELTON, NEBRASKA.

RIVETING-TOOL.

1,248,355. Specification of Letters Patent. Patented Nov. 27, 1917.

Application filed May 9, 1917. Serial No. 167,543.

*To all whom it may concern:*

Be it known that I, CHARLES S. LYLE, a citizen of the United States, residing at Shelton, in the county of Buffalo and State of Nebraska, have invented certain new and useful Improvements in Riveting - Tools; and I do hereby declare the following to be a full, clear, and exact description of the invention, such as will enable others skilled in the art to which it appertains to make and use the same.

This invention relates to a riveting tool which is particularly designed for riveting ledger plates to the finger guards of a mowing machine, whereby the ledger plates may be replaced, without necessitating the removal of a guard from the cutter bar structure, and without necessitating the removal of the cutter bar from the mowing machine.

Another object of this invention is to provide a tool as specified, which includes a substantially rectangularly shaped body portion having a downturned forward end which is provided with an opening for receiving the point of the guard finger and which has its rear end downturned and inturned to provide a horizontal portion which is split to receive the butt end or attaching plate portion of an ordinary finger guard for mower or harvester cutter bars and to connect an adjustable riveting member to the substantially rectangular body which riveting member is positioned so that the head of a rivet which is employed for attaching a ledger plate to the guards may be engaged by the tool and upset.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:

Figure 1 is a sectional view through a mowing machine cutter bar showing the riveting tool applied thereto, Fig. 2 is a horizontal section on the line 2—2 of Fig. 1, and Fig. 3 is a detail perspective view of the tool.

Referring more particularly to the drawings, 1 designates an ordinary cutter bar guard finger, and 2 indicates a ledger plate, such as is commonly used in cutter bar structures for mowing machines or grain harvesters. The riveting tool, which is generically indicated by the numeral 3 comprises a substantially rectangularly shaped body 4, which is constructed of a bar of iron and has one end downturned at an angle, as shown at 5. The downturned end 5 is disposed at an obtuse angle with respect to the main body 4 and it is provided with an opening 6 for receiving the point of the finger guard 1 of the cutter bar structure. The end of the body 4 opposite to the downturned end 5 is bent downwardly and inwardly to provide a horizontal portion 7 which is held in spaced relation from the main body portion 4 by means of the connecting portion 8. The horizontal portion 7 is split, as indicated at 9, and the arms 10 and 11, resulting from the splitting of the portion 7 are forced apart, as clearly shown in Fig. 3 of the drawings, so as to permit them to extend upon opposite sides of the attaching plate 12 of the finger guard 1 to hold the riveting tool in its proper position upon the cutter bar structure and eliminates the necessity of the removal of the guard from the cutter bar for the purpose of attaching a new ledger plate thereto.

The riveting member proper, which is generically indicated by the numeral 14 comprises a vertical externally screwthreaded bar 15 which extends adjustably through an opening 16 formed in the body 4 and which has a crank handle 17 formed upon its upper end. The rotation of the rod 15 through the medium of the crank handle 17, will move the tool 15 vertically, for upsetting the head of a rivet as indicated in dotted lines at 18, which rivet is employed for attaching the ledger plate 2 to the guard finger 1. The adjustment of the pin or rod 15 may be also employed for forcing out an old rivet, and forcing a new rivet in its proper position within the finger guard, as well as upsetting the end of the rivet and for holding the ledger plate 2 in place.

In reducing the invention to practice, certain minor features in construction, combination and arrangement of parts may necessitate alterations to which the patentee is entitled provided such alterations are comprehended within the scope of what is claimed.

What is claimed is:

1. In a riveting tool for riveting ledger plates to guard fingers, a body, one end of said body being downturned and provided with an opening for receiving the point of cutter bar guard finger, a riveting pin carried by said body intermediate of its ends, and means carried by the opposite end of the body for receiving the attaching portion of a guard finger and holding the riveting tool in place with respect thereto.

2. A riveting tool for riveting ledger plates to mowing machine cutter bars, including a body constructed of a substantially rectangular bar, one end of said body being downturned and provided with an opening for receiving the point of a finger guard, the end of said body opposite to said downturned end being bent to form a horizontal portion extending parallel with and in spaced relation to the main body of the riveting tool, an adjustable riveting pin adjustably carried by the body of said tool intermediate the end of the body, and a crank handle formed upon said pin for facilitating the operation thereof.

3. A riveting tool for riveting ledger plates to mowing machine cutter bars, including a body constructed of a substantially rectangular bar, one end of said body being downturned and provided with an opening for receiving the point of a finger guard, the end of said body opposite to said downturned end being bent to form a horizontal portion extending parallel with and in spaced relation to the main body of the riveting tool, an adjustable riveting pin adjustably carried by the main body of said tool intermediate its ends, a crank handle formed upon said pin for facilitating the operation thereof, said horizontally extending spaced portion being split and the arms resulting from the split being spread to form a recess for receiving the attaching portion of an ordinary finger guard.

In testimony whereof I affix my signature in presence of two witnesses.

CHARLES S. LYLE.

Witnesses:
H. R. ROBBINS,
R. D. TREAT.

Copies of this patent may be obtained for five cents each, by addressing the "Commissioner of Patents, Washington, D. C."